United States Patent
Oaknin et al.

(10) Patent No.: US 6,856,751 B2
(45) Date of Patent: Feb. 15, 2005

(54) METHOD AND SYSTEM FOR OBTAINING VARIABLE OPTICAL ATTENUATION WITH VERY LOW POLARIZATION DEPENDENT LOSS OVER AN ULTRA WIDE DYNAMIC RANGE

(75) Inventors: David Oaknin, Rehovot (IL); Eran Brand, Kiron (IL); Shay Caspi, Givataim (IL); Nahum Izhaki, Kfar Saba (IL)

(73) Assignee: Lynx Photonic Networks, Inc., Calabasas Hills, CA (US)

( * ) Notice: Subject to any disclaimer, the term of this patent is extended or adjusted under 35 U.S.C. 154(b) by 188 days.

(21) Appl. No.: 10/159,044

(22) Filed: Jun. 3, 2002

(65) Prior Publication Data

US 2003/0180027 A1 Sep. 25, 2003

Related U.S. Application Data

(60) Provisional application No. 60/366,183, filed on Mar. 22, 2002.

(51) Int. Cl.$^7$ ............................. G02B 6/00; G01C 19/72
(52) U.S. Cl. .......................... 385/140; 385/14; 385/24; 356/464; 356/477
(58) Field of Search ................................. 385/3, 11, 14, 385/15, 16, 24, 140; 356/464, 477

(56) References Cited

U.S. PATENT DOCUMENTS

| | | | | |
|---|---|---|---|---|
| 6,035,078 A | * | 3/2000 | Dagens et al. | ................. 385/14 |
| 6,463,183 B2 | * | 10/2002 | Mizuno | ...................... 382/282 |
| 2003/0039461 A1 | * | 2/2003 | How Kee Chun et al. | . 385/140 |

FOREIGN PATENT DOCUMENTS

| EP | 1 279 999 A1 | * | 7/2001 | ................. 385/140 |
|---|---|---|---|---|
| GB | 2187858 | | 9/1987 | |

* cited by examiner

Primary Examiner—Phan T. H. Palmer
(74) Attorney, Agent, or Firm—Mark M. Friedman

(57) ABSTRACT

A method and system of operating a variable optical attenuator to provide a required total attenuation in a planar lightwave circuit. The method comprises providing a first Mach-Zehnder interferometer having a first and a second arm carrying signals in an arbitrary polarization state, providing a second Mach-Zehnder interferometer having a third and a fourth arm carrying signals in an arbitrary polarization state, the second Mach-Zehnder interferometer concatenated in tandem with the first Mach-Zehnder interferometer, and cooperatively operating the concatenated first and second Mach-Zehnder interferometers to obtain the required total attenuation and an effectively nil polarization dependent loss.

9 Claims, 8 Drawing Sheets

METHOD AND SYSTEM FOR OBTAINING VARIABLE OPTICAL ATTENUATION WITH VERY LOW POLARIZATION DEPENDENT LOSS OVER AN ULTRA WIDE DYNAMIC RANGE

This application claims the benefit of provisional application No. 60/366,183 filed Mar. 22, 2002.

FIELD AND BACKGROUND OF THE INVENTION

Variable optical attenuators (VOAs) serve two primary purposes in optical transmission systems: first, it is often necessary to reduce the power level of an incoming optical signal to match its intensity to the optimum operating level of a receiver component. Second, an optical attenuator is also an essential element of any equalization component, which aims at adjusting the power in the optical channels to correct signal distortions experienced throughout the transmission. The adjustment of the power level of optical signals should be done with high accuracy, repeatability and reliability. Furthermore, the present communications market requires these devices to be fabricated at low cost. Solid-state devices designed and fabricated using Planar Lightwave Circuits (PLC) technology, with no moving parts, can fulfill these demands.

A 1×1 Mach-Zehnder interferometer (MZI), one of the most successful and useful structures built in PLC technology, can be employed as a VOA with very wide dynamical attenuation range, from total transparency (except for a small insertion loss) in its passive state, to absolute active suppression (in some cases beyond 30 dB) of the incoming signal. Nevertheless, a VOA based on an MZI configuration (as being used today) usually suffers from a serious drawback, namely its polarization dependence.

In a simple prior art embodiment, a 1×1 MZI is based on a Y splitter and a Y combiner facing each other along the main propagation axis, and two symmetric arms connecting the inward branches of the splitter and the combiner. The Y-splitter splits the input signal into two symmetric, coherent and in-phase signals, each carrying 50% of the incoming energy. The dynamical performance of the MZI is controlled through active elements located on at least one, and preferably on both of the internal arms. Each active element can change the refractive index of the arm upon which it is located and, therefore, can induce a difference in the optical lengths of the two (otherwise symmetric) arms. Consequently, the active element introduces a controlled phase shift between the coherent signals propagating in the two arms. The combiner gathers the symmetric projection of the two shifted signals at the output of the MZI, and radiates the antisymmetric projection as losses. This yields the required attenuation.

In other prior art 1×1 MZI embodiments, the Y splitter, the Y-combiner, or both, can be replaced by 2×2-couplers (either directional couplers, adiabatic couplers or any other coupler, for example, the use of two directional couplers in a MZI configuration as a variable attenuator is described in UK Patent Application GB 2 187 858 A) to form a 1×2, 2×1 or 2×2 configuration with one input waveguide and/or one output waveguide used as idle ports. In configurations with an idle output port, the discarded projection of the actively shifted signals is not radiated, but transmitted to this idle port.

In certain embodiments, the internal arms of the MZI may also have non-equal optical lengths (e.g. a MZI with directional couplers that transmits the signal in bar configuration in its passive state). These asymmetric embodiments have, in general, higher wavelength-dependent losses at low attenuation over broad wavelength bands. In order to reduce power consumption, it is usually advisable that the passive operational state yields maximal transparency (zero attenuation).

Nonetheless, in each of these prior art embodiments of an MZI structure, the VOA usually evidences a severe problem of polarization dependent loss (PDL), especially at high attenuation values. This happens because the phase of the two different polarizations, TE and TM, is shifted differently at the internal arms, due to fabrication process-related effects such as material stresses, inhomogeneity, etc, or due to intrinsic asymmetry in the waveguide cross-section (e.g. a waveguide width different from its height). The higher the attenuation, the more severe the problem becomes: while PDL is typically in the range of a small fraction of a dB when the attenuation is lower than 3 dB, it grows monotonically up to several dB units at high attenuations (5 dB and above).

Conventionally, a series of two or more concatenated MZIs in a tandem is used in order to achieve a higher attenuation range than that of a single element. When two MZIs are placed one after the other, the attenuated signal at the output of the first MZI enters subsequently into the second MZI as an input signal, and then undergoes a second attenuation process. The two MZIs are normally separated by a few millimeters of a straight waveguide that supports only a single optical mode, which guarantees that unwanted optical power, which was actively projected by the first MZI onto a high-order mode, is completely radiated and does not reach the input of the second MZI. The two concatenated MZIs can provide an attenuation range wider than 50 dB, twice the width of the attenuation range provided by a single MZI. However, this VOA, when operated in the conventional way, suffers from the same severe PDL problem affecting the VOAs based on a single MZI.

Therefore it would be highly advantageous to have a method of designing and operating a VOA built in PLC technology and desirably based on the well-known MZI structure, which can provide a very wide operational attenuation range and very low polarization dependence over the whole range of operation.

SUMMARY OF THE INVENTION

We have theoretically and experimentally demonstrated that the prior structure with two MZIs concatenated in a tandem can be actively operated as a VOA in a novel way that provides extremely small PDL on its ultra-wide attenuation range. This novel way of operation exploits the fact that each single MZI can be dynamically controlled over its whole attenuation range through either one of the active elements placed on both MZIs arms, with the common feature that the PDL of the MZI has opposite signs in these two operating modes. That is, if TE polarized signals are more attenuated than TM polarized signals when the MZI is operated through the active element located on, say, first internal arm, then TM polarized signals are more attenuated than TE polarized signals when the structure is operated through the active element located on the second internal arm. Therefore, the two concatenated MZIs can be appropriately calibrated to fix the total attenuation to the required value and the total PDL to zero, if each one of the concatenated elements does a fraction of the total desired attenuation while working in sectors of PDL with opposite sign. This novel way of operating the structure does not demand higher power consumption.

According to the present invention there is provided a method of operating a variable optical attenuator to provide a required total attenuation in a planar lightwave circuit, comprising providing a first Mach-Zehnder interferometer having a first and a second arm carrying signals in an arbitrary polarization state therethrough, providing a second Mach-Zehnder interferometer having a third and a fourth arm carrying signals in an arbitrary polarization state therethrough, the second Mach-Zehnder interferometer concatenated in tandem with the first Mach-Zehnder interferometer, and cooperatively operating the concatenated first and second Mach-Zehnder interferometers to obtain the required total attenuation and an effectively nil polarization dependent loss.

According to one feature of the method of the present invention, the step of cooperatively operating the concatenated first and second Mach-Zehnder interferometers includes operating the first Mach-Zehnder interferometer to provide both a total first attenuation and, for each signal in an arbitrary polarization state, a first polarization dependent loss having a first sign, and operating the second Mach-Zehnder interferometer to provide both a total second attenuation and, for each signal in an arbitrary polarization state, a second polarization dependent loss having a second sign opposite to the first sign, whereby the sum of the first and the second total attenuations equals the total required attenuation, and whereby the first and the second polarization dependent losses effectively cancel each other.

According to another feature of the method of the present invention, the step of providing the first Mach-Zehnder interferometer includes providing a first 1×1 MZI having a first splitter and a first combiner, and wherein the step of providing the second Mach-Zehnder interferometer includes providing a second 1×1 MZI having a second splitter and a second combiner.

According to yet another feature of the method of the present invention, the step of providing the first Mach-Zehnder interferometer includes replacing at least one element selected from the group consisting of the first splitter and the first combiner with a first coupler.

According to yet another feature of the method of the present invention, the step of providing the second Mach-Zehnder interferometer includes replacing at least one element selected from the group consisting of the second splitter and the second combiner with a second coupler.

According to yet another feature of the method of the present invention, the step of providing the first Mach-Zehnder interferometer includes replacing at least one element selected from the group consisting of the first splitter and the first combiner with one or two couplers, and wherein the step of providing the second Mach-Zehnder interferometer includes replacing at least one element selected from the group consisting of the second splitter and the second combiner with one or two couplers.

In other embodiments of the invention in which the VOA is designed as part of a larger optical device with other functionalities, it is possible to achieve the required attenuation by using two MZIs that are not adjacent to each other and connected directly, but may be located at different positions within the device. Optionally, additional optical elements may be inserted between the two MZIs. The operation of the two MZIs is done in the same way as in the case of two concatenated elements, and yields zero PDL attenuation for signals propagation in an optical path that passes through both MZIs.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

The present invention is of a novel method of operating two concatenated 1×1 MZIs normally connected by a short single-mode waveguide (typically a few millimeters long), as a VOA with ultra-wide attenuation range as well as very low PDL over the entire operational range.

Figure 1A:
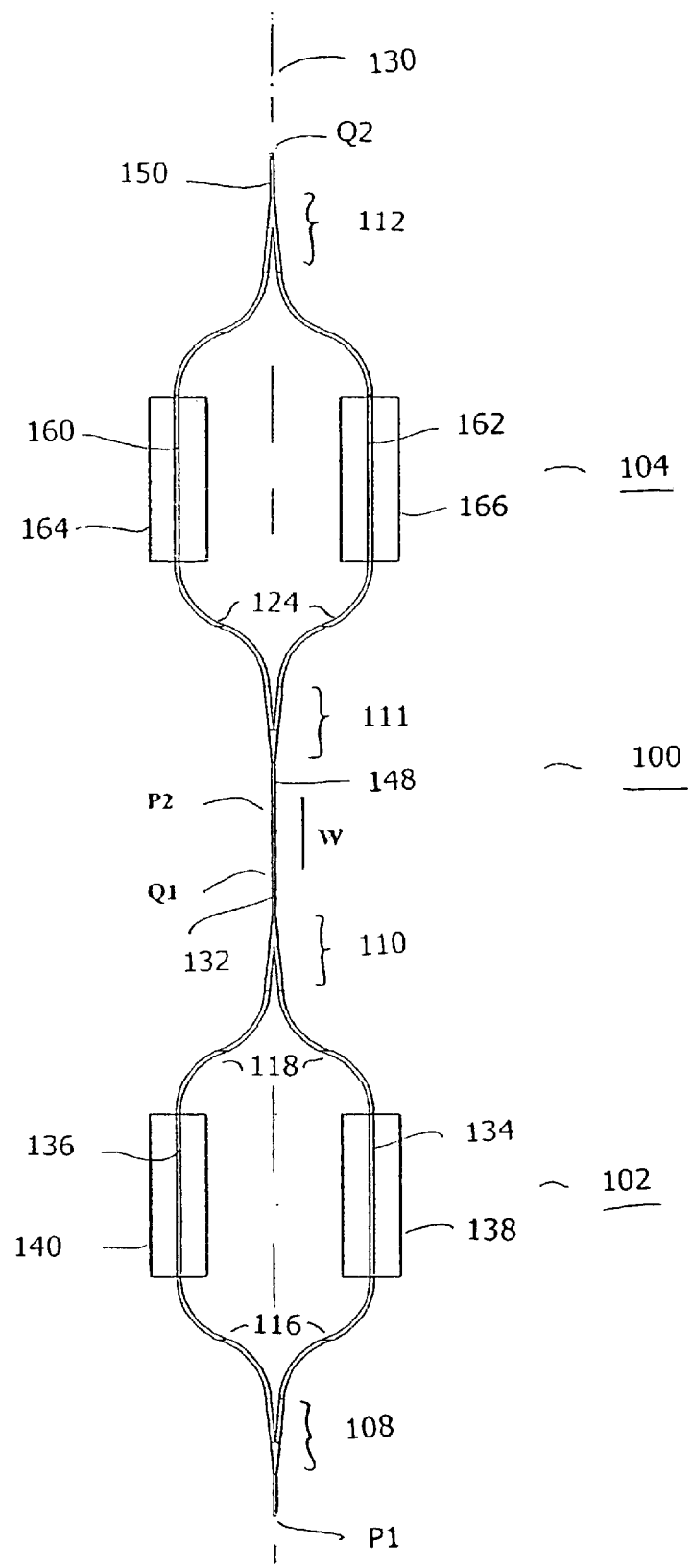
FIG. 1a shows a simple embodiment of two concatenated 1×1 MZIs according to the present invention.

FIG. 1a shows a simple embodiment of a variable optical attenuator (VOA) 100 that can provide very low PDL and ultra wide dynamic range according to the present invention. VOA 100 includes a first MZI 102 and a second MZI 104 concatenated in tandem. Each MZI includes one splitter and one combiner. MZI 102 includes a splitter 108 and a combiner 110, while MZI 104 includes a splitter 111 and a combiner 112. Hereafter, "splitter" and "combiner" are used interchangeably since their structure is normally identical. Each splitter has a pair of symmetrical branches. Thus, splitter 108 has symmetrical branches 116, combiner 110 has symmetrical branches 118, splitter 111 has symmetrical branches 124 and combiner 112 has symmetrical branches 126. In the particular embodiments shown in FIGS. 1a and b, all symmetrical branches are symmetrical relative to a main propagation axis 130 of VOA 100. In general, as detailed below, this condition is relaxed, particularly when the two MZIs are not adjacent to each other.

First MZI 102 has one input port P1 connected through a single-mode input waveguide 106 to splitter 108, which serves here as an input 3 dB splitter. Combiner 110, which serves here as an output combiner, is aligned with splitter 108 along main propagation axis 130, with their symmetrical branches 116 and 118 facing each other. Combiner 110 is connected through a single-mode output waveguide 132 to an output port Q1 of the MZI. Symmetrical branches 116 and 118 are connected by two well-separated, single-mode waveguide internal arms 134 and 136, which may (but do not have to) be parallel to each other and to main propagation axis 130. An active element is located on each internal arm: an element 138 on arm 134, and an element 140 on arm 136. The active elements are elements that can introduce a change in an optical property of the respective arm. The active elements may be thin film resistors or heating elements, in which case they induce, via the thermo-optical effect, a change in the local index of refraction in the arm. The dynamical performance of MZI 102 can be controlled through either one of the active elements 138 and 140.

Second MZI 104 is preferably a duplicate of the first MZI, and can be located with its main axis in any orientation. It has a similar structure to MZI 102 and contains an input port P2, connected through a single-mode input waveguide 148 to symmetrical branches 124 of splitter 111, and an output port Q2 connected through a single-mode output waveguide 150 to symmetrical branches 126 of combiner 112. The splitter and the combiner face each other and are connected by two well-separated, single-mode waveguide internal arms 160 and 162, with active elements 164 and 166 respectively located on these arms. The dynamical performance of MZI 104 can be controlled through either one of active elements 164 and 166. In other embodiments, one of the four active elements 138, 140, 164, 166 may be removed. However at least one of the MZIs 102, 104 must contain active elements on both arms. The optical lengths of the internal arms may also be different in some configurations. In many cases, however, in order to reduce power consumption it is desirable that this does not yield any attenuation of the signal (except for, maybe, a small insertion loss) in the passive state of the MZI. In the preferable embodiments of the invention, output combiner 110 (112) is a mirror image of input splitter 108 (111) with respect to the plane perpendicular to main propagation axis 130, and the arms are symmetrically located along the axis.

The elements represented in the figures have been rescaled for clarity, and do not necessarily represent actual proportions. All waveguides in the present invention support a single optical mode for all relevant wavelengths. This usually dictates typical waveguide widths and heights of a few $\mu$m for VOAs designed to operate in the standard infrared bands of commercial optical communication networks.

In the preferred embodiments of the VOA of the present invention, illustrated by FIG. 1a, two MZIs such as MZIs 102 and 104 are concatenated in tandem by connecting output port Q1 of first MZI 102 to an input port P2 of second MZI 104 through a single-mode waveguide W, which is typically a few millimeters long, and has typical cross section dimensions of few microns, constrained by the requirement that the waveguide should support only a single optical mode within the operational band. The method for calculating the desired dimensions based on the above requirement is well known in the art. Input port P1 and output port Q2 are used to connect the device to other components or devices. A signal that reaches input port P1 is actively attenuated in two successive stages by first MZI 102 and second MZI 104 before it reaches output port Q2. Each stage, in addition, induces an independent contribution to the total PDL.

In the embodiment shown in FIG. 1a, the two MZIs are adjacent to each other, being separated by waveguide W. However, in the general case, the two MZIs do not have to be positioned adjacently to each other, and may in fact be positioned at different locations in an optical circuit, while connected optically either directly, or indirectly through other optical elements.

Figure 1B:
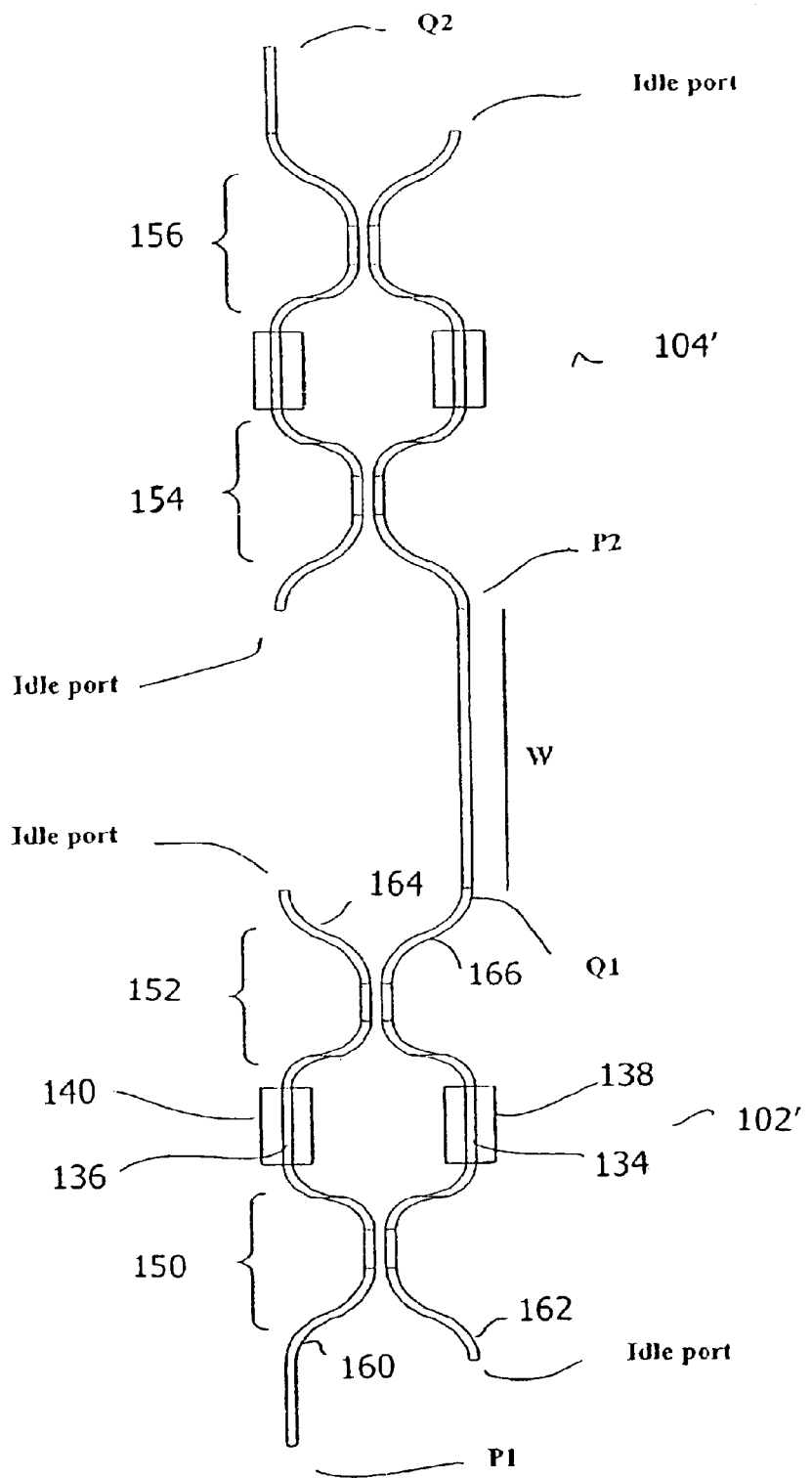
FIG. 1b shows a simple embodiment of two concatenated 2×2 MZIs according to the present invention.

In other embodiments of the VOA, 3 dB 2×2 couplers can replace one or both splitters of the 1×1 MZI to form a 1×2, 2×1 or 2×2 configuration with the additional input/output waveguides connected to idle ports. For example, in the 2×2 configuration shown in FIG. 1b, couplers 150 and 152 replace respectively splitter 108 and combiner 110 in a MZI 102', while couplers 154 and 156 replace respectively splitter 111 and combiner 112 in a MZI 104'. In a 2×2 configuration that consists of two MZIs, each MZI has two input and two output waveguides. In FIG. 1b, MZI 102' has two input waveguides 160 and 162, and two output ports 164 and 166. "Input" and "output" are interchangeable. One input and one output in each MZI is used (for MZI 102' waveguides 160 and 166 respectively), while the other input and output (waveguides 162 and 164 respectively) are not used, and thus they serve as idle ports. For both MZIs, there are a total of 4 idle ports. Waveguide 162 can serve as input port while waveguide 160 can serve as idle port. However, either the minimal attenuation state is active in this case, or the optical length of one arm of MZI 102' should be modified to bring this MZI to a passive bar state. Similarly, waveguide 164 can be used as output port and waveguide 166 as idle port, but the minimal attenuation state is achieved either actively or by an optical length difference in MZI 104'. A 1×1 configuration has no idle ports. In FIG. 1b, the 3 dB couplers are directional couplers, but adiabatic 3 dB couplers or any other 3 dB couplers can be used instead.

In use, an optical signal in an arbitrary polarization state enters one MZI, for example the first MZI at input port P1, and is split in the input splitter (FIG. 1a) or coupler (FIG. 1b) of respectively first MZI 102 or 102' into two coherent signals traveling on each of the internal arms 134 and 136, each signal carrying approximately 50% of the input power. Active elements 138 and 140 located on each internal arm 134 and 136 can be used to change the optical property of the respective arm, and by doing so introduce a controlled phase shift $\Delta\phi$ between the signals traveling on both arms. A consequence of the induced phase shift is that only a fraction $f=\cos^2(\Delta\phi/2)$ of the input power exits the first MZI through output port Q1. The remaining power $r=\sin^2(\Delta\phi/2)$ is radiated (in MZI 102) or directed to idle ports (in MZI 102'). This process yields the first stage of the wanted attenuation, but it operates differently for the TE and TM polarization components of the signal, since the induced phase shift $\Delta\phi$ is not the same for both polarizations. A second stage of the attenuation can be obtained using the second MZI in a similar fashion. The following includes the detailed description of the process occurring in one MZI, with the understanding that a similar process occurs in the other MZI.

We denote by $I^{TE}$ and $I^{TM}$ the values of attenuation for each of the two different polarization components at the output of, say, first MZI 102 (e.g. Q1 in FIG. 1a). They are given, in dB units, by the expressions:

$$I^{TE}=I^{TE}(w)=-20*\log\left(|\cos(\Delta\phi^{TE}/2)|\right) \quad (1)$$

$$I^{TM}=I^{TM}(w)=-20*\log\left(|\cos(\Delta\phi^{TM}/2)|\right), \quad (2)$$

where $\Delta\phi^{TE}$, the actively induced phase shift between the coherent signals propagating in the TE polarization state along the two arms of the MZI, is usually slightly different than $\Delta\phi^{TM}$, the phase shift induced in the TM polarization state. The independent variable "w" parameterizes the dynamical state of the operated active element of the MZI. In most common cases, w is the applied voltage or power in the active element. We will use the convention that w is positive if applied on one internal arm (say arm 1, chosen arbitrarily) and negative if it is applied on the other internal arm (say arm 2) of the MZI.

In a given dynamical state, PDL is defined as the difference, in dB, between the attenuations of TE and TM polarized signals. When the difference $(\Delta\phi_{TE}-\Delta\phi_{TM})$ is small, we can use the linear approximation:

$$PDL(w) = I^{TE}(w) - I^{TM}(w) \approx (20/In(10)) * \tan(\Delta\phi^{TM}/2) * (\Delta\phi^{TE} - \Delta\phi^{TM})/2 \quad (3)$$

Figure 2:
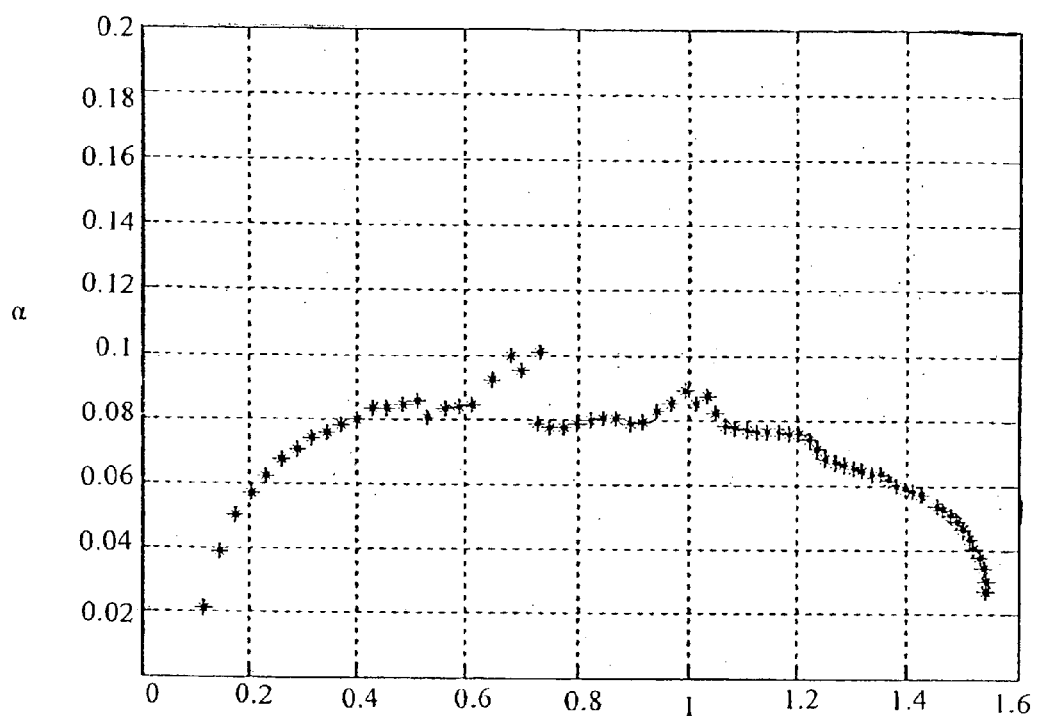
FIG. 2 shows the experimental results for the difference between the phase shifts actively introduced by one of the two concatenated MZIs to the TE and TM polarized signals as a function of a phase shift $\Delta\phi_{TM}/2$ actively introduced to the TM polarized signal.
Figure 3:
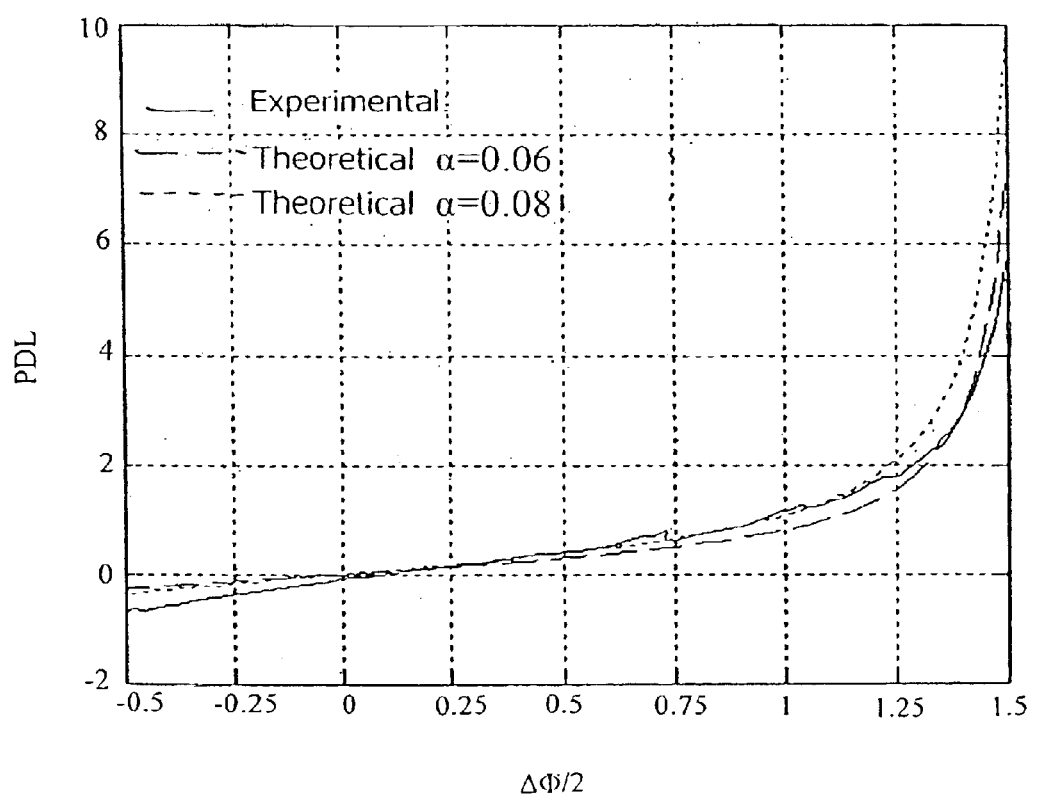
FIG. 3 shows experimental and theoretical results of PDL of one of the two concatenated MZIs as a function of a phase shift $\Delta\phi_{TM}/2$ actively introduced to the TM polarized signal.

This theoretical expression is checked and compared with experimental results in FIGS. 2 and 3.

We define the following phase-shift difference parameter:

$$\alpha = (\Delta\phi^{TE} - \Delta\phi^{TM})/2 \quad (4)$$

Equation (3) yields an analytical expression for this parameter:

$$\alpha \approx (In(10)/20) * PDL/\tan(\Delta\phi^{TM}/2). \quad (5)$$

This theoretical prediction, as well as values computed from experimental data for PDL as a function of the attenuation angle, $\Delta\phi^{TM}/2$, in the range $[0, \pi/2]$ measured in radians, are depicted in FIG. 2. The experimental data are shown in the figure as stars. From this figure we can clearly see that the phase difference $\alpha$ is, with high accuracy, almost a constant over the entire attenuation range. That is, a changes by 0.02 radians, from 0.06 up to 0.08, when $\Delta\phi^{TM}/2$ varies over the interval from 0.2 to 1.4 radians, so that $\alpha$ can be considered approximately constant. FIG. 2 can also be understood as an experimental way to measure the phenomenological parameter $\alpha$, which characterizes the PDL of the single MZI as a function of the attenuation.

FIG. 3 shows experimental results of PDL as a function of the attenuation angle $\Delta\phi^{TM}/2$ (full line) together with theoretical predictions using two different values for the parameter $\alpha$ consistent with the experimental results as shown in FIG. 2, namely, $\alpha=0.06$ (dashed line) and 0.08 (dotted line). The figure shows a very good agreement between the experimental results and the theoretical predictions.

From the theoretical expression, as well as from experimental results, we conclude that PDL should change its sign when we switch from mediating the attenuation by changing the refractive index in one arm (arm 1, positive w) to changing the refractive index in the other arm (arm 2, negative w); that is, the PDL should change sign when attenuation is done with $\Delta\phi/2$ in the interval $[0, \pi/2]$ or in the interval $[-\pi/2, 0]$. We refer below to this change of PDL sign as a result of the way the attenuation in each MZI is mediated as "working in a sector of PDL with a given sign"

Figure 4:
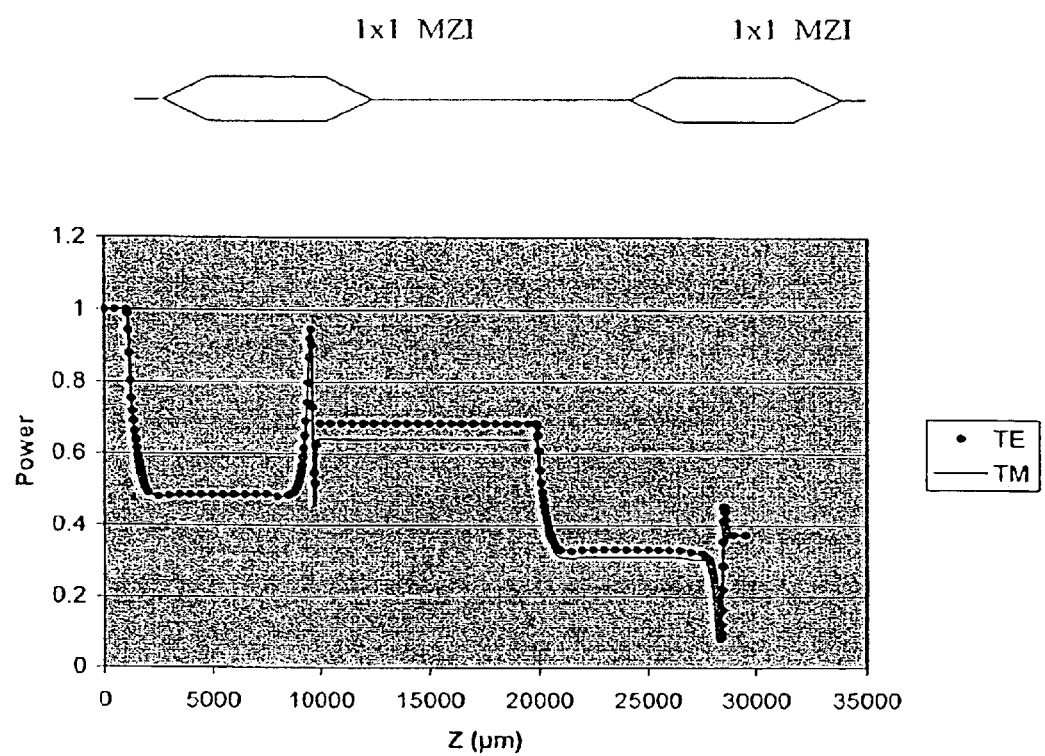
FIG. 4 shows a simulated example of the attenuation process of TE and TM polarized signals through the two concatenated MZIs when they are operated according to the method of the present invention.

We exploit this feature to build and operate a VOA able to provide an ultra-wide attenuation range and approximately zero effective PDL, by concatenating two MZIs in series, and by using the new method of operation as described herein. The essence of the new method is this: each one of the concatenated MZI does a fraction of the total required attenuation, while working in sectors of PDL with opposite sign. Thus the first MZI receives an input signal at its input and does a fraction of the total required attenuation while working for example in a sector of plus PDL, outputting a partially attenuated output signal to the second MZI. The second MZI receives the partially attenuated signal and performs the remainder of the total required attenuation while working in this example in a sector of minus PDL. The (opposite sign) PDLs induced in the two MZIs are essentially equal in magnitude, thus canceling each other. The output of the second MZI is a totally attenuated signal with essentially zero PDL. The two components are calibrated so that the total PDL is essentially zero, as explained below and as shown graphically for a particular case in FIG. 4. The new way of operation does not demand higher power consumption. Hereafter we omit the label TM from the variable $\Delta\phi^{TM}$ in the equations, except when the notation is clearer otherwise, and use the notation I for $I^{TM}$. Subscripts "1", "2" in these variables shall denote the corresponding MZI number.

Let $$I_1(w1) = -20 * \log(|\cos(\Delta\phi_1/2)|) \quad (6)$$

be the attenuation produced by the first MZI, and $$I_2(w2) = -20 * \log(|\cos(\Delta\phi_2/2)|) \quad (7)$$

be the attenuation produced by the second MZI, on the TM polarized light.

$$PDL_1(w1) = (20/In(10)) * \tan(\Delta\phi_1/2) * \alpha_1 \quad (8)$$

is the PDL induced in the first MZI and $$PDL_2(w2) = (20/In(10)) * \tan(\Delta\phi_2/2) * \alpha_2 \quad (9)$$

is the PDL induced in the second MZI. The phenomenological parameters $\alpha_1$ and $\alpha_2$ can be determined experimentally following the same technique we used to determine the parameter of the single MZI. In a first stage, for example, the first MZI is kept in a fixed state while the state of the second MZI is actively changed. Measures of attenuation and PDL are registered at the output of the two concatenated MZI and so $\alpha_2$ can be computed. In a second stage the roles of the MZIs are interchanged, the second one is kept fixed while the first one is actively operated, and $\alpha_1$ can be computed.

We require that the two concatenated MZIs yield a given total attenuation I on the TM polarized signal, $$I(w1, w2) = I_1(w1) + I_2(w2) \quad (10)$$

as well as effectively zero total PDL, $$0 = PDL_1(w1) + PDL_2(w2) = (I^{TE}(w1) - I^{TM}(w1))_1 + (I^{TE}(w2) - I^{TM}(w2))_2 \quad (11)$$

The first condition requires $$\Delta\phi_2/2 = \pm\cos^{-1}(10^{-(I/20)}/\cos(\Delta\phi_1/2)) \quad (12)$$

where $\Delta\phi_1/2$ is still a free parameter that can vary in the range $[0, \cos^{-1}(10^{(I/20)})]$. Therefore, this degree of freedom can be used to fix, in addition, the total PDL to zero, which requires that the condition $$\Delta\phi_2/2 = -\tan^{-1}(\tan(\Delta\phi_1/2) * (\alpha_1/\alpha_2)) \quad (13)$$

is also fulfilled. $\Delta\phi_2/2$ is chosen with a plus or minus sign relative to $\Delta\phi_1/2$, which means that attenuation in each of the MZIs is reached by changing the refractive index in one arm or the other, depending on the relative signs of $\alpha_1$ and $\alpha_2$.

Figure 5:
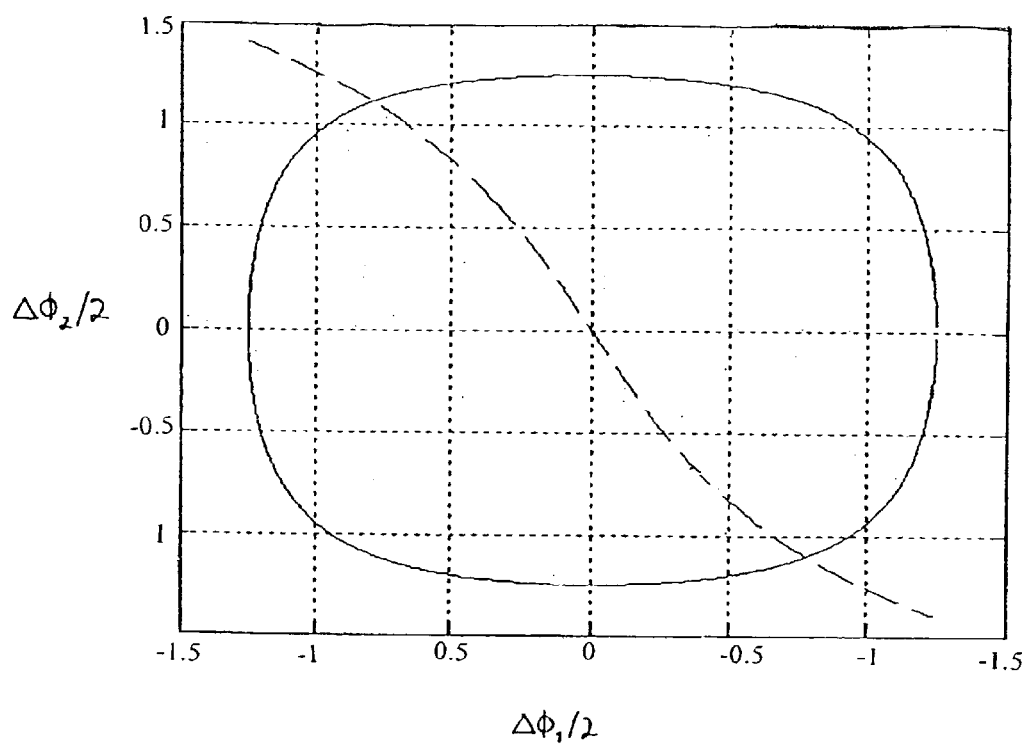
FIG. 5 shows a graphic solution for the system of two equations (12 and 13) for the particular case I=10 dB $\alpha=2$ $\alpha_2$.

The solution for the system of two equations (12 and 13) is presented graphically in FIG. 5 for the particular case: I=10 dB and $\alpha_1 = 2 \alpha_2$. We find numerically:

$$\Delta\phi_1/2 = \pm 0.7854 \text{ and } \Delta\phi_2/2 = \mp 1.10715$$

expressed in radians, or in terms of attenuation values $$I_1 = 3.01 \ dB \text{ and } I_2 = 6.99 \ dB,$$

done while the active elements are operated on opposite arms, for example on arm 134 of MZI 102 and arm 160 of MZI 104 in FIG. 1a. In summary, the coordinated, cooperative operation of the two concatenated MZIs in which the two stages (first and second MZI) are operated so that they yield PDLs with opposite sign and substantially equal magnitude that cancel each other, results in the VOA having the required total attenuation while its total PDL is effectively reduced to about zero.

The previous discussion can be generalized to any VOA based on a configuration with two independent stages concatenated in tandem that can be operated in separated sectors with opposite PDL, by simply solving the system of equations $$I=I_1(w1)+I_2(w2) \tag{14}$$

$$0=(I^{TE}(w1)-I^{TM}(w1))_1+(I^{TE}(w2)-I^{TM}(w2))_2=PDL_1(w1)+PDL_2(w2) \tag{15}$$

for the two independent parameters w1 and w2.

EXAMPLES

In order to demonstrate the invention and its advantages and superior performance, we have built various embodiments of the device of the present invention using planar lightwave circuits (PLC) technology, and operated them in the novel way disclosed herein. A VOA with buried channel waveguides of silica with $\Delta N=0.75\%$ (index of refraction difference between waveguide core and clad) was built on a silicon substrate. The dimensions of the waveguide were fixed to a width w=6 $\mu$m and a height h=6 $\mu$m, so that it supports only a single guided mode in the wavelength band 1.52 $\mu$m–1.62 $\mu$m.

Figure 6:
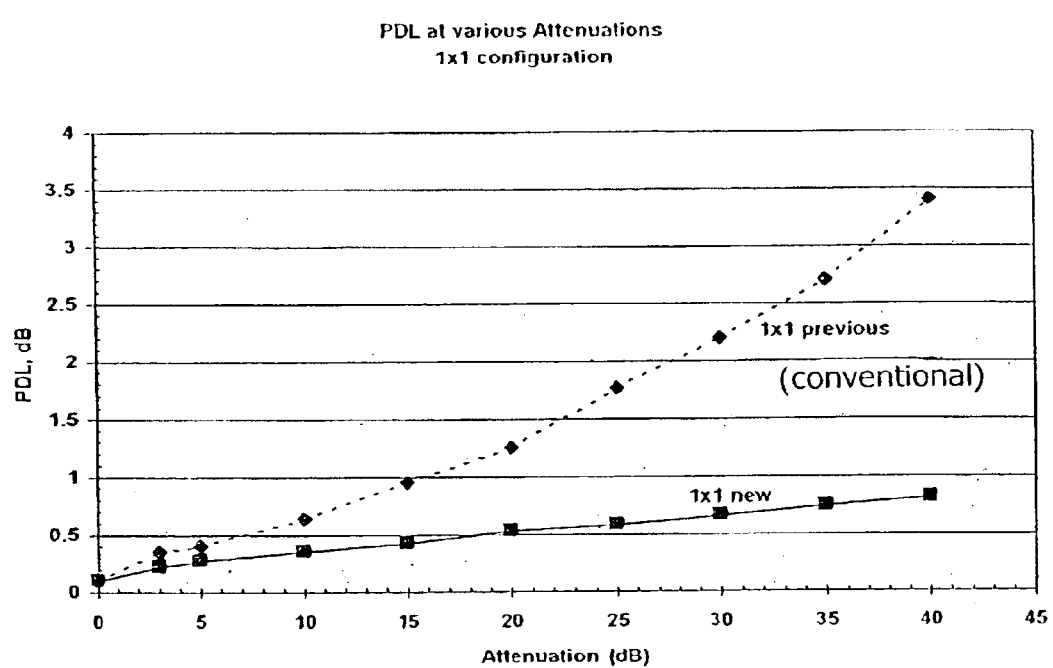
FIG. 6 shows PDL at various attenuations for a (cascaded) 1×1 VOA.

In the simplest embodiment wherein each MZI contains a Y splitter and a Y combiner facing each other in a mirror image, we measured, as shown in FIG. 6, a PDL of 0.35 dB when the total attenuation of the signal was 10 dB and the device was operated in the novel way described herein. In contrast, when the VOA was operated in the conventional (prior art) way, the PDL reached 0.65 dB for the same total attenuation. Moreover, using the method of the present invention, the PDL did not exceed a maximum of 0.8 dB, instead of 3.4 dB that results in the conventional way of operation, over a very wide range of operation of 40 dB.

Figure 7:
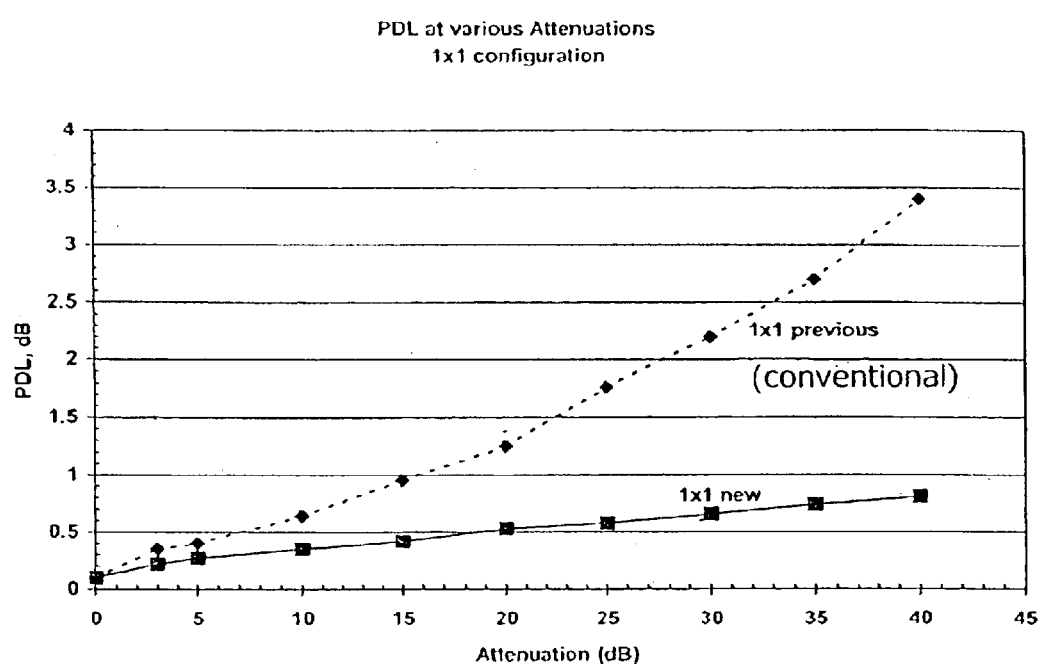
FIG. 7 shows PDL at various attenuations for a (cascaded) 2×2 VOA.

In another, 2×2 embodiment, as in FIG. 1b, wherein each of the splitters of the previous configuration was replaced by a 2×2 directional coupler, we measured, as shown in FIG. 7, a PDL of 0.44 dB when the total attenuation of the signal was 10 dB, and when the device was operated in the novel method of operation described herein, whereas the PDL reached 1.57 dB for the same total attenuation when the device was operated in the conventional way. For a full attenuation range of 40 dB we obtained a PDL of 12 dB with conventional operation, and a reduced PDL of 1.2 dB using the method of the present invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method of operating a variable optical attenuator to provide a required total attenuation in a planar lightwave circuit, comprising:
   a) providing a first Mach-Zehnder interferometer having a first and a second arm carrying signals in an arbitrary polarization state therethrough,
   b) providing a second Mach-Zehnder interferometer having a third and a fourth arm carrying signals in an arbitrary polarization state therethrough, said second Mach-Zehnder interferometer concatenated in tandem with said first Mach-Zehnder interferometer, and
   c) cooperatively operating said concatenated first and second Mach-Zehnder interferometers to obtain the required total attenuation and an effectively nil polarization dependent loss by:
      i. operating said first Mach-Zehnder interferometer to provide both a total first attenuation and, for each said signal in an arbitrary polarization state, a first polarization dependent loss having a first sign, and
      ii. operating said second Mach-Zehnder interferometer to provide both a total second attenuation and, for each said signal in an arbitrary polarization state, a second polarization dependent loss having a second sign opposite to said first sign, whereby the sum of said first and said second total attenuations equals the total required attenuation, and whereby said first and said second polarization dependent losses effectively cancel each other.

2. The method of claim 1, wherein said step of providing said first Mach-Zehnder interferometer includes providing a first 1×1 MZI having a first splitter and a first combiner, and wherein said step of providing said second Mach-Zehnder interferometer includes providing a second 1×1 MZI having a second splitter and a second combiner.

3. The method of claim 2, wherein said step of providing said first Mach-Zehnder interferometer includes replacing at least one element selected from the group consisting of said first splitter and said first combiner with a first coupler, and wherein said step of providing said second Mach-Zehnder interferometer includes replacing at least one element selected from the group consisting of said second splitter and said second combiner with a second coupler.

4. The method of claim 2, wherein said step of providing said first Mach-Zehnder interferometer includes replacing at least one element selected from the group consisting of said first splitter and said first combiner with a first coupler.

5. The method of claim 2, wherein said step of providing said second Mach-Zehnder interferometer includes replacing at least one element selected from the group consisting of said second splitter and said second combiner with a second coupler.

6. The method of claim 1, wherein each said substep of operating said first and second Mach-Zehnder interferometers to provide both said respective total attenuations and said polarization dependent losses having a respective sign further includes:
   A. calibrating the variable optical attenuator, and
   B. using results of said calibration to operate each of said MZIs and bring it to an active state related to the total attenuation and to a polarization dependent loss.

7. The method of claim 6, wherein said substep of calibrating is achieved by measuring polarization dependent losses $I^{TM}$ and $I^{TE}$ for different values of active control parameters $w_1$ and $w_2$, and by solving equations 14 and 15 for all the required total attenuation values.

8. The method of claim 6, wherein said substep of calibrating includes measuring an average phase-shift difference parameter for each said MZI using equation 5, and wherein said substep of obtaining an active state includes solving equations 12 and 13 for all the required total attenuation values.

9. The method of claim 1, wherein said first and second Mach-Zehnder interferometers are connected indirectly and optionally through other optical components, and are located in different sections of an optical layout.

* * * * *